April 3, 1928.  W. KISTLER  1,664,822

METHOD OF ASSEMBLING TABULAR STEEL SPOKED AUTOMOBILE WHEELS

Filed Aug. 30, 1924

Inventor.
Wm. Kistler
by Featherstonhaugh & Co
Attys.

Patented Apr. 3, 1928.

1,664,822

UNITED STATES PATENT OFFICE.

WILLIAM KISTLER, OF CHATHAM, ONTARIO, CANADA.

METHOD OF ASSEMBLING TUBULAR-STEEL-SPOKED AUTOMOBILE WHEELS.

Application filed August 30, 1924. Serial No. 735,150.

My invention relates to improvements in methods of assembling tubular steel spoked automobile wheels and the object of the invention is to devise a method which will do away with the necessity of welding the tubular spokes to the felloe and to the hub.

A further object is to devise a method which will enable a wheel to be constructed which is sufficiently strong to withstand all road conditions but which will be sufficiently resilient to permit temporary distortion out of its plane due to transverse shocks or pressure and which will automatically restore itself to its initial form on the removal of such shock or pressure.

My invention consists of the method of assembly hereinafter more particularly described and illustrated in the accompanying drawing in which.

Like characters of reference indicate corresponding parts in the different views.

Figure 1:
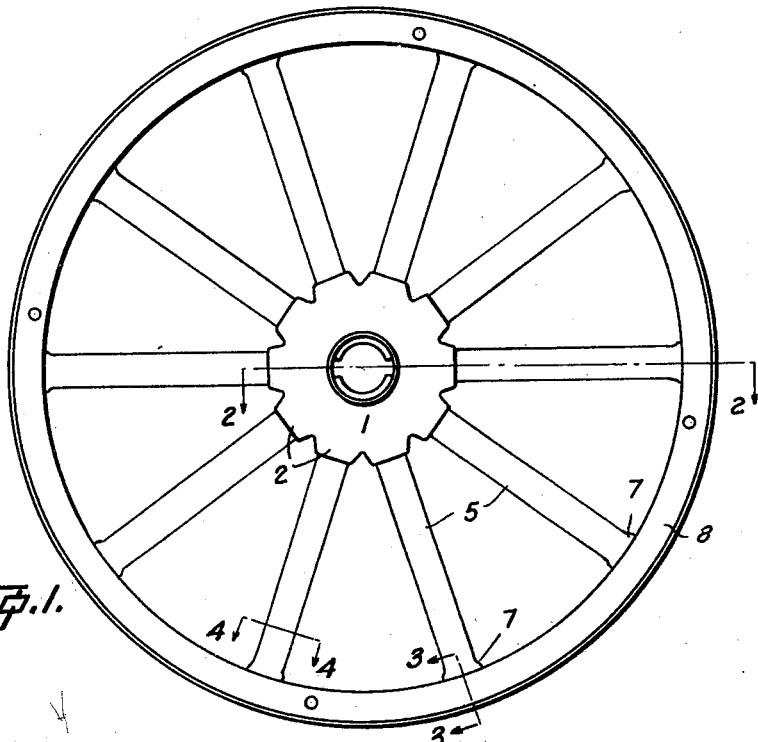
Fig. 1 represents a side elevation of the wheel constructed according to my method.
Figure 2:
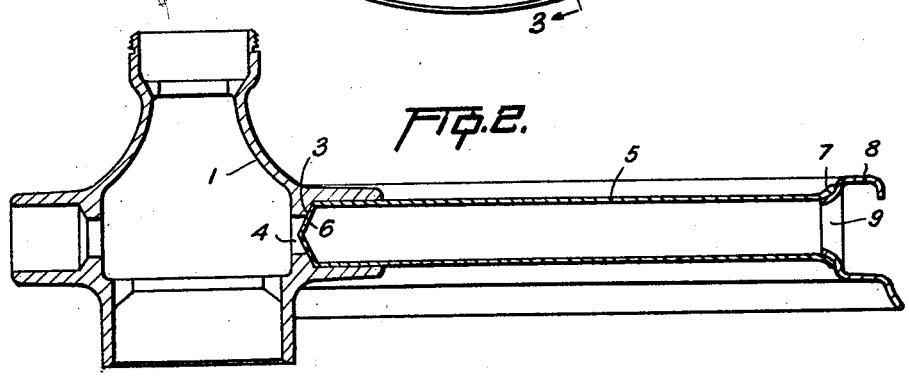
Fig. 2 is an enlarged sectional view through the line 2—2 Figure 1.
Figure 3:
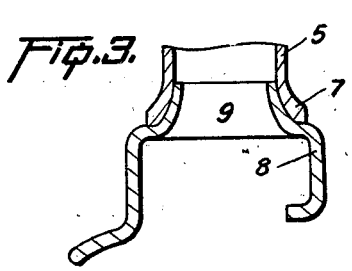
Fig. 3 is a cross sectional view on the line 3—3 Figure 1.
Figure 4:
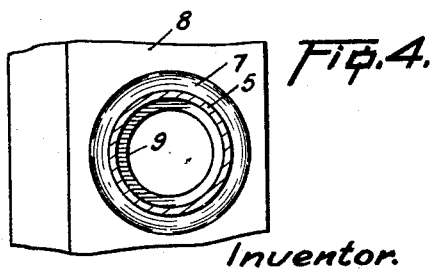
Fig. 4 is a sectional view through the spoke taken on the line 4—4 Figure 1.

1 is the wheel hub provided with a plurality of radially extending hollow bosses 2, the interior of each boss terminating in a tapered face 3 communicating with an orifice 4 which extends through from the interior of the boss into the interior of the hub. 5 are the tubular steel spokes, their inner or hub ends upset to constitute the tapered feet 6 of corresponding taper to the taper of the face 3. The outer ends 7 of the tubular spokes 5 are swelled out so as to be of greater diameter than the cross sectional diameter of the spokes. 8 is the steel felloe of the wheel applied to the outer ends 7 of the spokes and having the spigots 9 stamped inwardly thereof so as to coact with such outer ends 7 of the spokes 5.

My method of assembly is as follows:

I take the hub 1 and apply to the hollow bosses 2 thereof the inner ends of the spokes 5 so that the tapered feet 6 thereof engage the faces 3 of the interior of such bosses, mounting the hub and spokes on a spider or other device which will hold the spokes and hub in the required position.

The internal diameter of the felloe 8 is of slightly less diameter than the distance between the outer extremities of the corresponding spokes 5 and in order to apply the felloe to such spokes I heat it until the metal expands sufficiently to permit the felloe to be slipped over the outer ends of the spokes into its required centred position. By means of a press I then stamp the inwardly extending spigots 9 out of the faces of the felloe so that they engage the interior walls of the ends 7 of such spokes.

As the felloe cools and the metal therein contracts it will be apparent that the spokes 5 will be subjected thereby to compression stresses with the result that an exceedingly strong wheel will be constituted without the necessity of having to weld the felloe to the spokes or the spokes to the hub. Thus, it will be seen that I have devised a method which in addition to achieving the manufacture of an exceedingly strong wheel can be carried out with great simplicity and in which the resultant wheel will be exceedingly flexible to transverse pressure or shocks, thus obviating the strain on the axles on which the wheels are mounted that would occur if the wheels were rigid.

What I claim as my invention is:

A method of assembling tubular steel spoked automobile wheels which consists in providing the spoke bosses of a hub with hollow interiors having tapered bottoms into which are inserted the correspondingly tapered upset inner ends of the spokes, the outer ends of the spokes having been previously swelled out into bell-like form, then applying to the outer ends of the spokes a heated and consequently expanded steel felloe which at normal temperatures is of an internal diameter slightly less than the distance between the outer ends of the opposed spokes, and subsequently stamping out of the felloe inwardly extending tapering spigots engaging the interior walls of the swelled out outer ends of the spokes, the heated felloe upon cooling contracting to its above normal diameter whereby the spokes are placed under compression stresses, said contraction of the felloe on cooling forcing the tapered inner ends of the spokes into their centred position in engagement with the tapered bottoms of hollow interiors of the hub.

WILLIAM KISTLER.